(12) United States Patent
Soneira

(10) Patent No.: US 7,808,554 B2
(45) Date of Patent: Oct. 5, 2010

(54) AUTOMATIC AND INTERACTIVE CONFIGURATION AND CONTROL OF A VIDEO SYSTEM

(75) Inventor: Raymond M. Soneira, Amherst, NH (US)

(73) Assignee: Displaymate Technologies Corporation, Amherst, NH (US)

( * ) Notice: Subject to any disclaimer, the term of this patent is extended or adjusted under 35 U.S.C. 154(b) by 1034 days.

(21) Appl. No.: 11/378,732

(22) Filed: Mar. 17, 2006

(65) Prior Publication Data

US 2006/0212923 A1 Sep. 21, 2006

Related U.S. Application Data

(60) Provisional application No. 60/663,557, filed on Mar. 18, 2005, provisional application No. 60/672,327, filed on Apr. 18, 2005.

(51) Int. Cl.
*H04N 7/00* (2006.01)
(52) U.S. Cl. ...................................... 348/460
(58) Field of Classification Search .................. None
See application file for complete search history.

(56) References Cited

U.S. PATENT DOCUMENTS

| 5,570,108 | A | * | 10/1996 | McLaughlin et al. | ........ | 715/823 |
|---|---|---|---|---|---|---|
| 5,671,011 | A | * | 9/1997 | Kim | ........................... | 348/189 |
| 5,739,809 | A | * | 4/1998 | McLaughlin et al. | ........ | 345/594 |
| 5,847,701 | A | * | 12/1998 | Eglit | .......................... | 345/204 |
| 5,987,624 | A | * | 11/1999 | Eglit | .......................... | 714/32 |
| 7,154,493 | B2 | * | 12/2006 | Yee | ............................ | 345/211 |
| 7,313,809 | B1 | * | 12/2007 | Mohan et al. | ............... | 725/109 |
| 2002/0104096 | A1 | * | 8/2002 | Cramer et al. | .............. | 725/113 |

OTHER PUBLICATIONS

PCT International Search Report, Mar. 17, 2006.

* cited by examiner

*Primary Examiner*—Paulos M Natnael
(74) *Attorney, Agent, or Firm*—Michaelson & Associates; Peter L. Michaelson

(57) ABSTRACT

The present invention involves inserting a sequence of computer-like commands into a video signal stream (230) and which contain data processing instructions (401; 457; 500) and video test patterns (407; 452) in order to automate the integration, configuration, set up, adjustment, calibration and control of the components (131; 132; 133) in a video system, such as an HDTV, a studio video camera, or Telecine conversion of filmed content. The command source can be any video hardware signal source or any video program content, such as a DVD being played in a DVD player, a game console, game software, a Set Top Box or broadcast video.

14 Claims, 12 Drawing Sheets

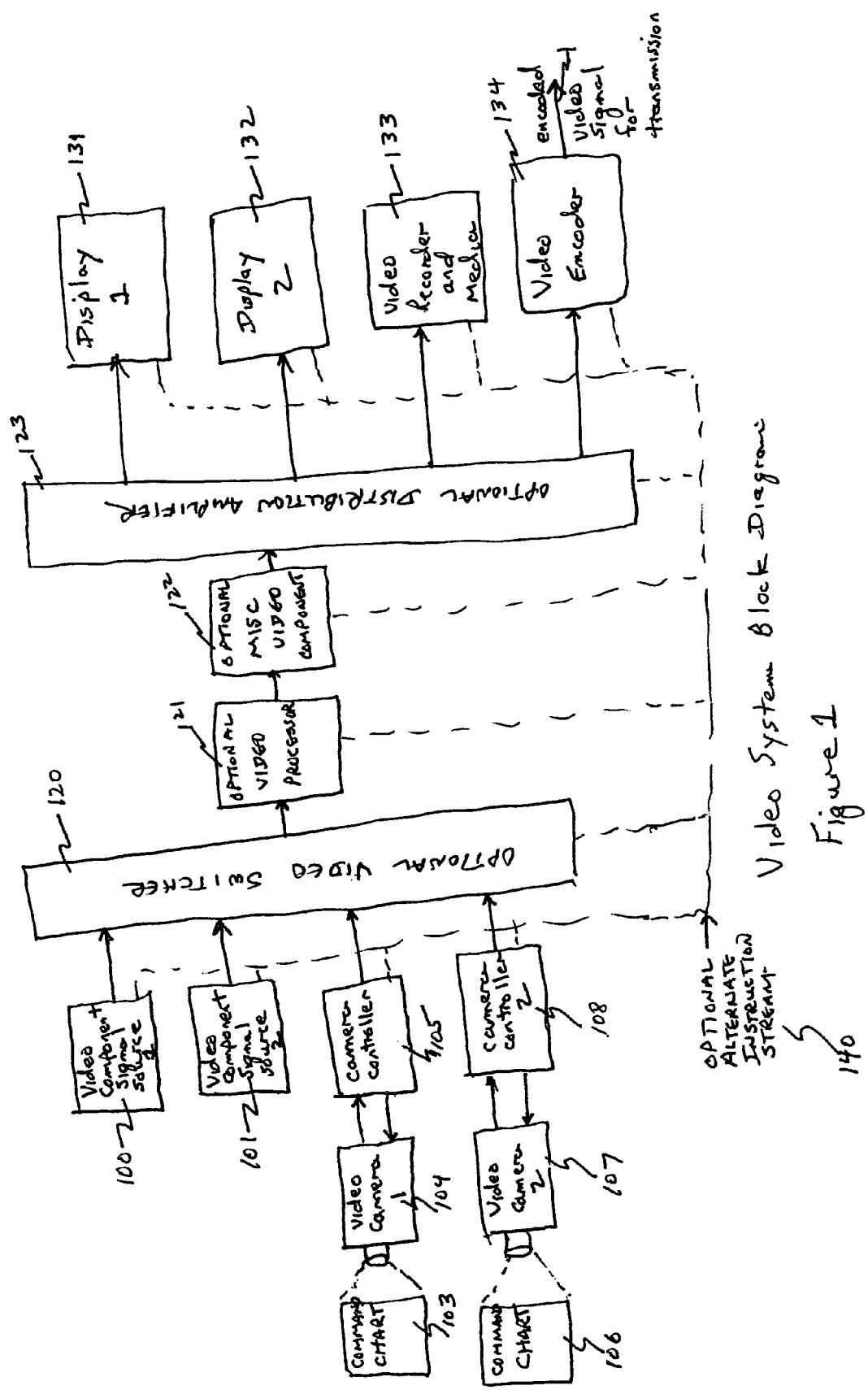

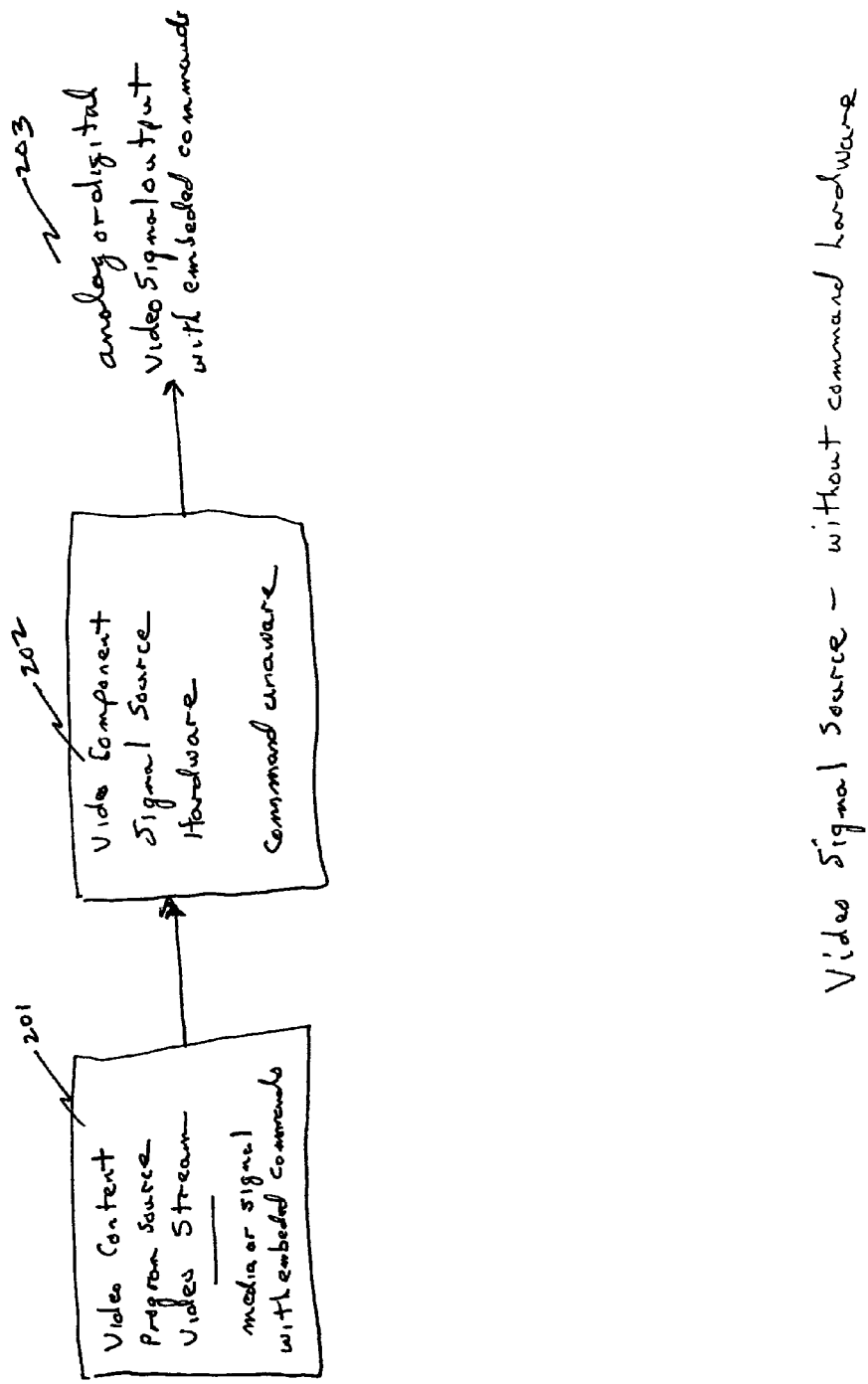

Video Signal Source with Command Hardware

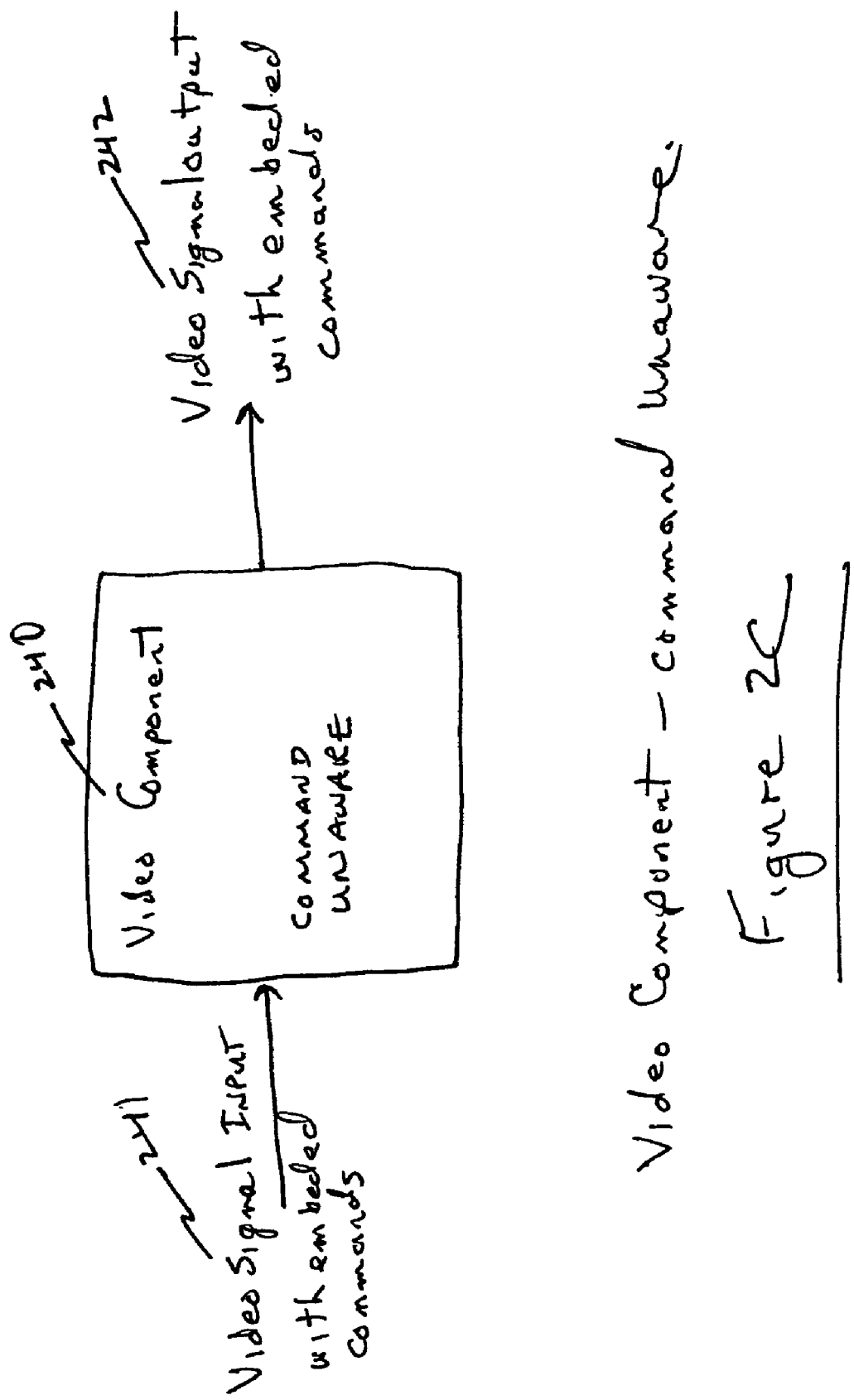

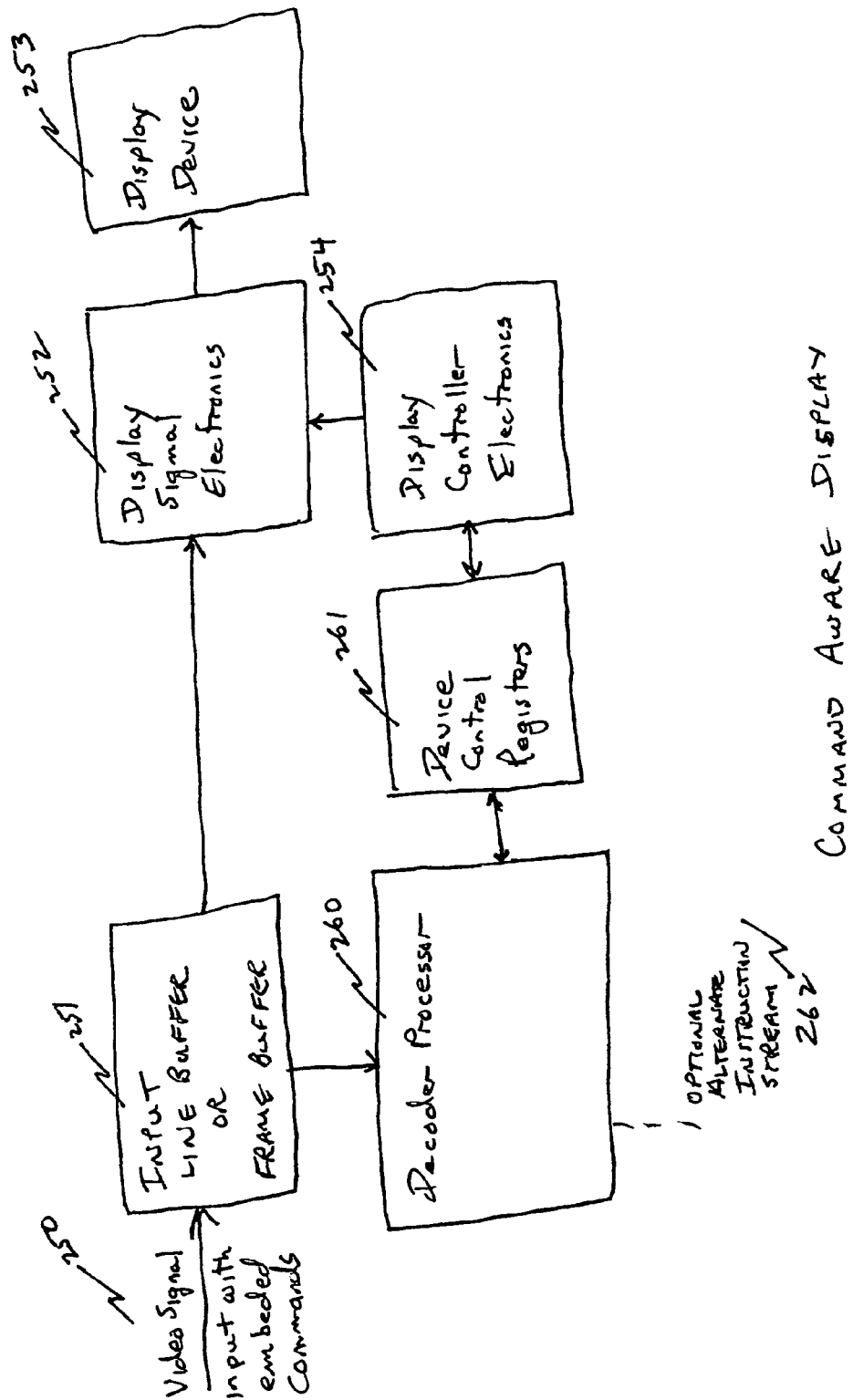

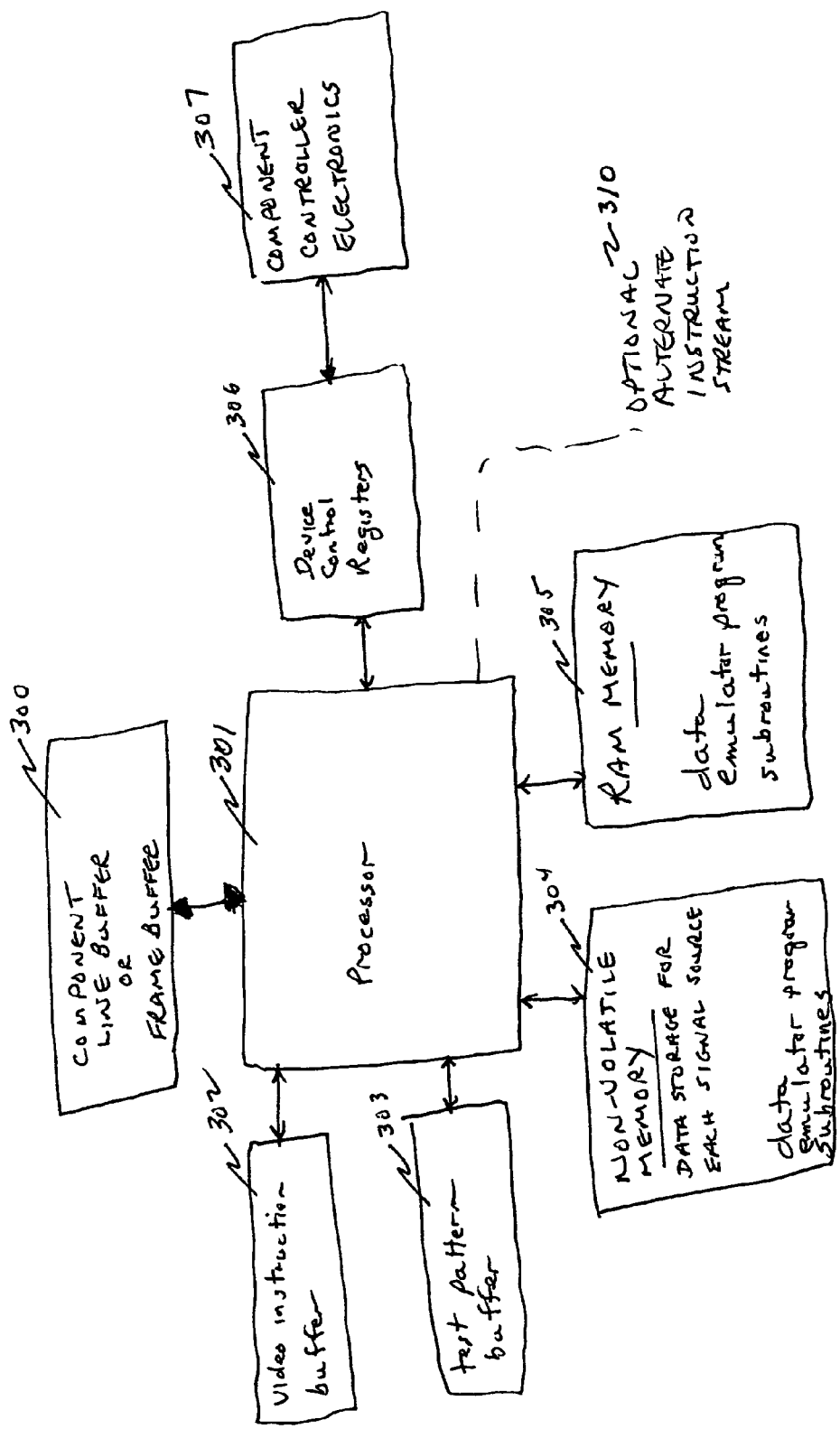

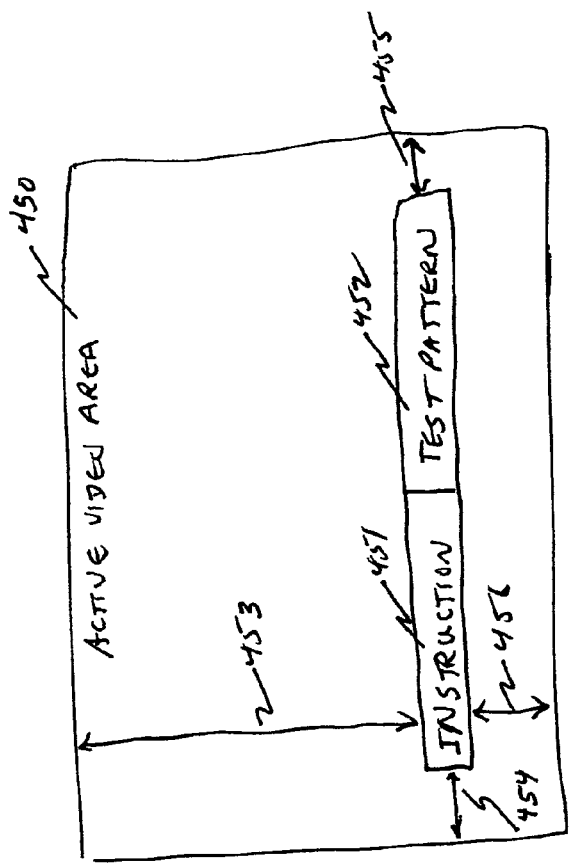
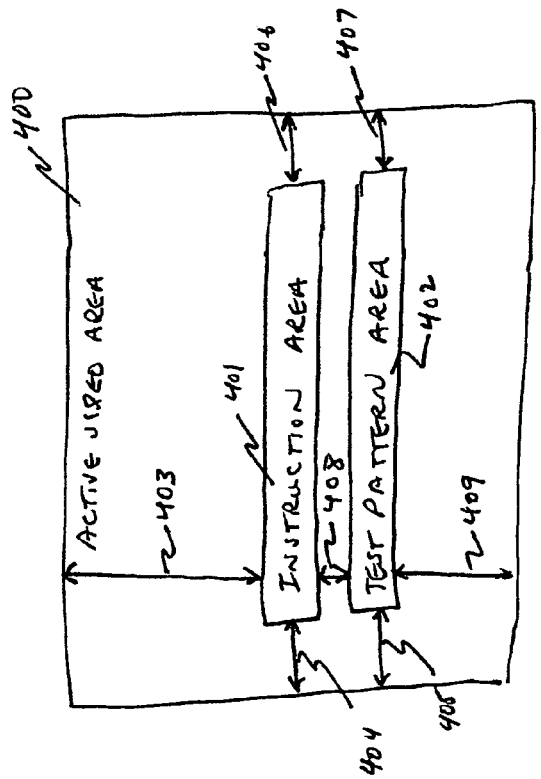
COMMAND ARCHITECTURE
FIGURE 4

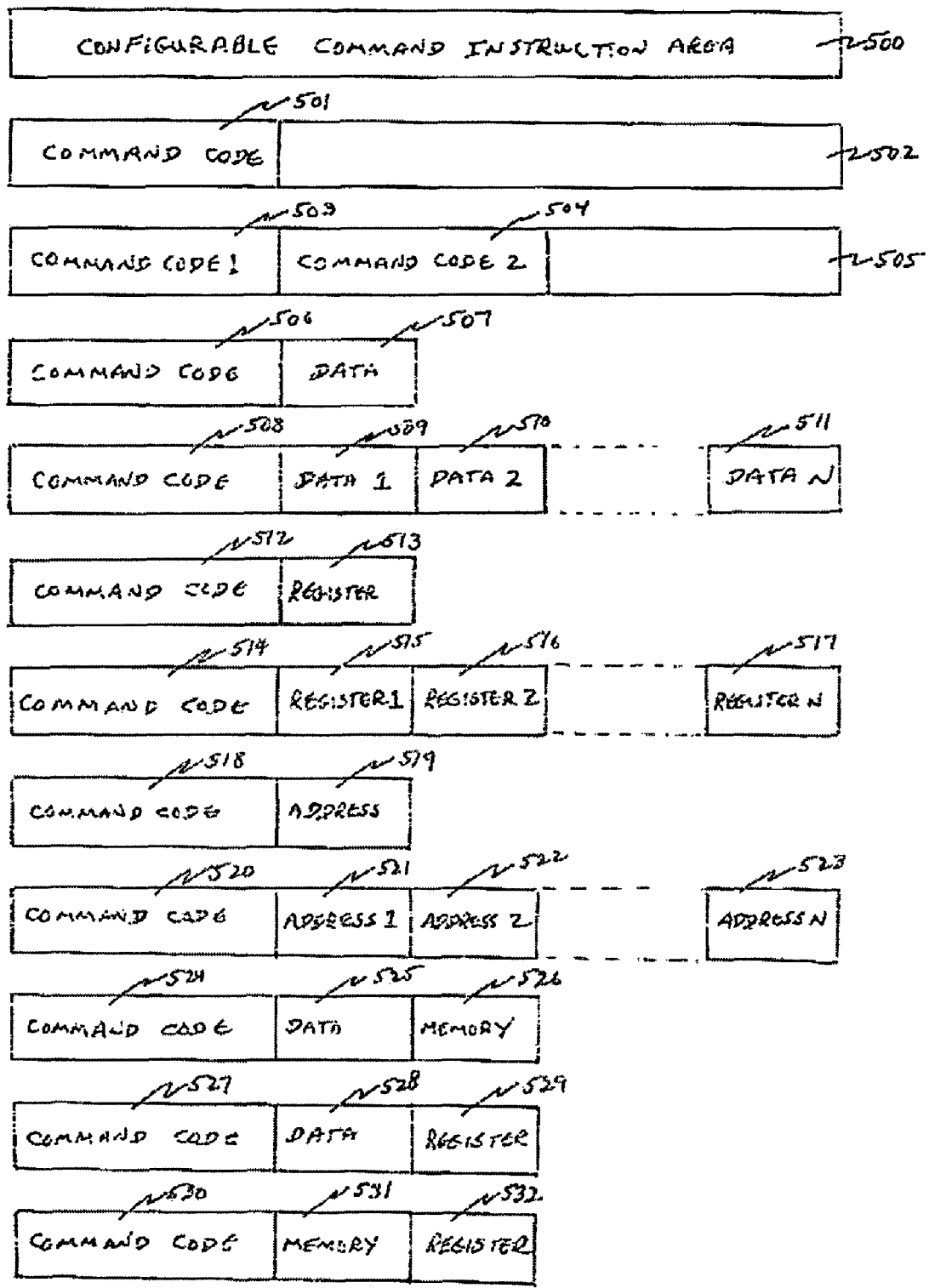
FIGURE 5 INSTRUCTION ARCHITECTURE

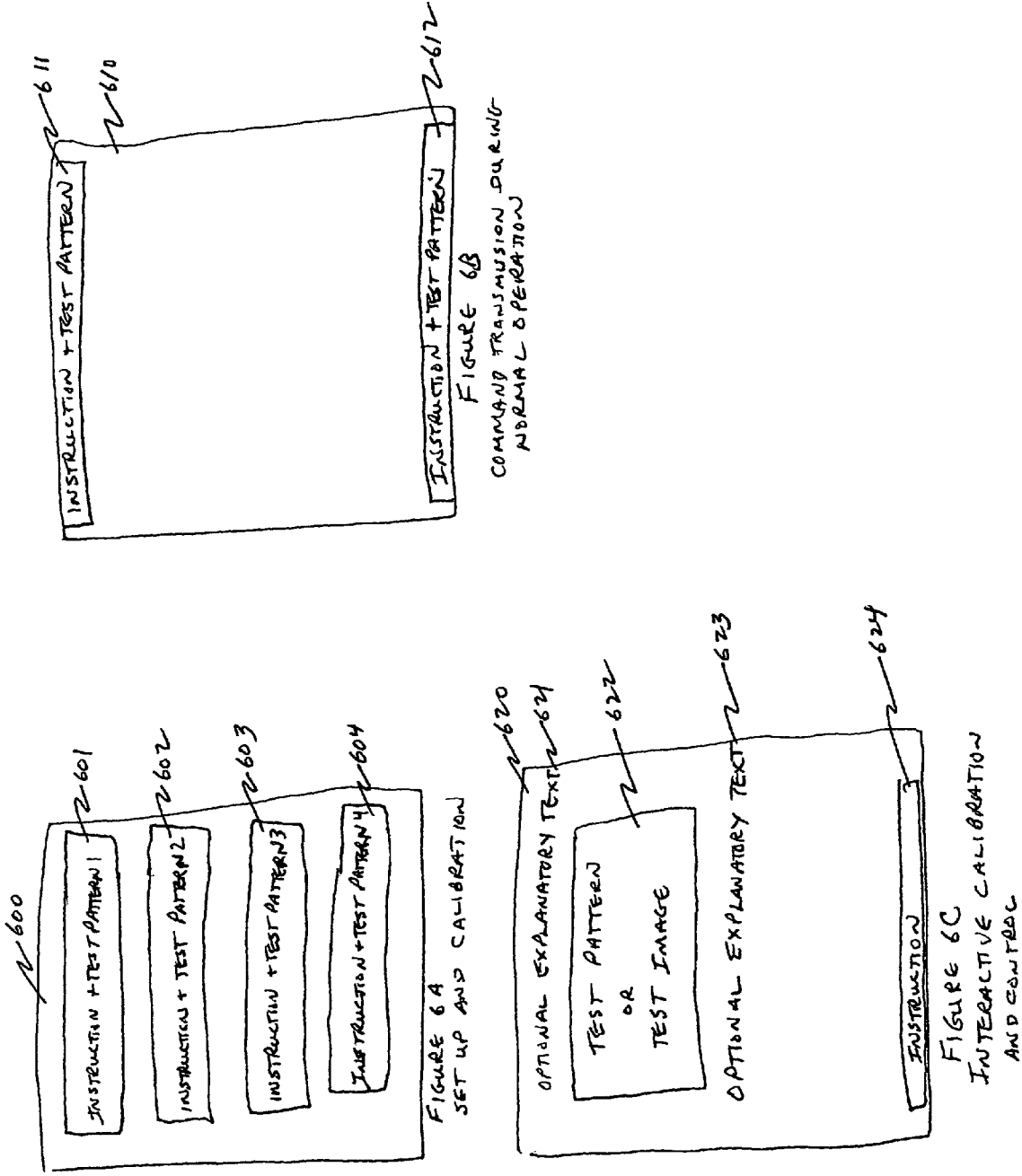

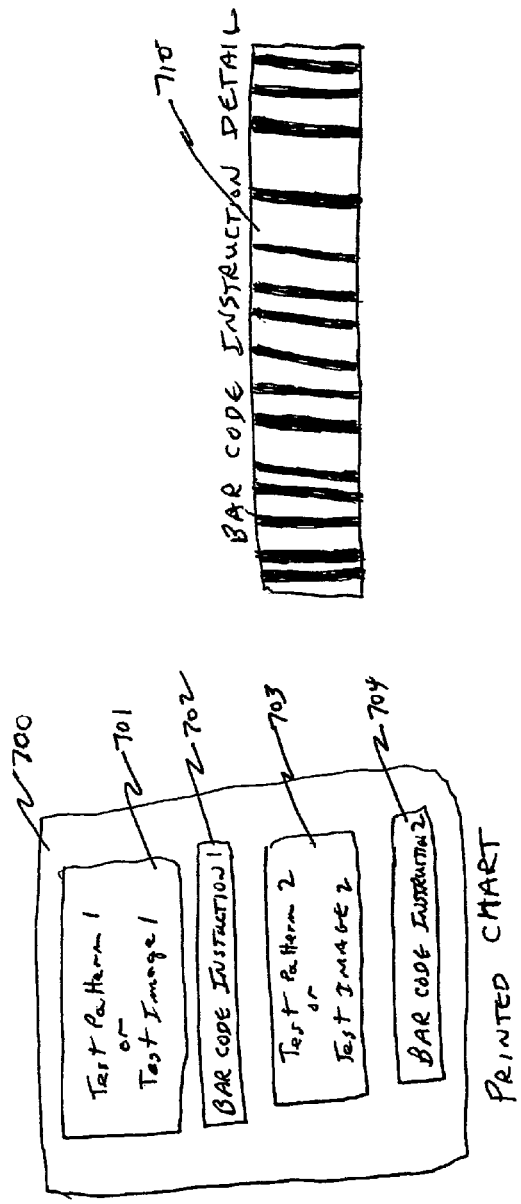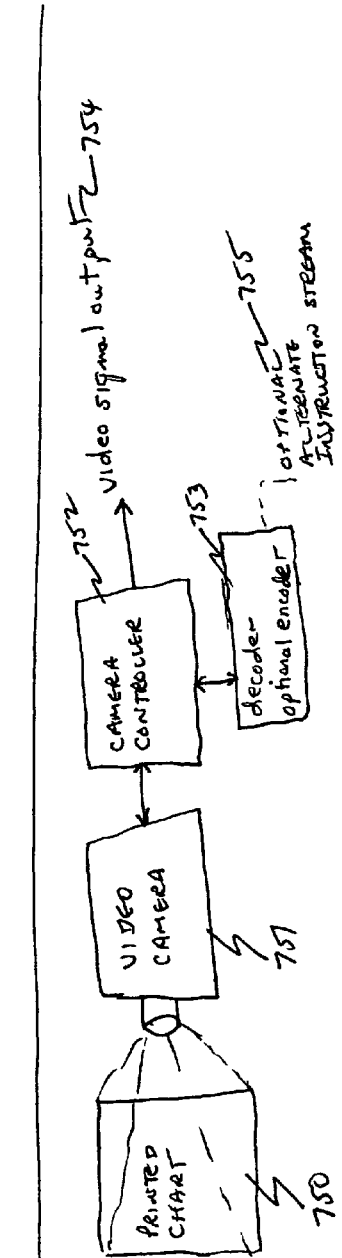

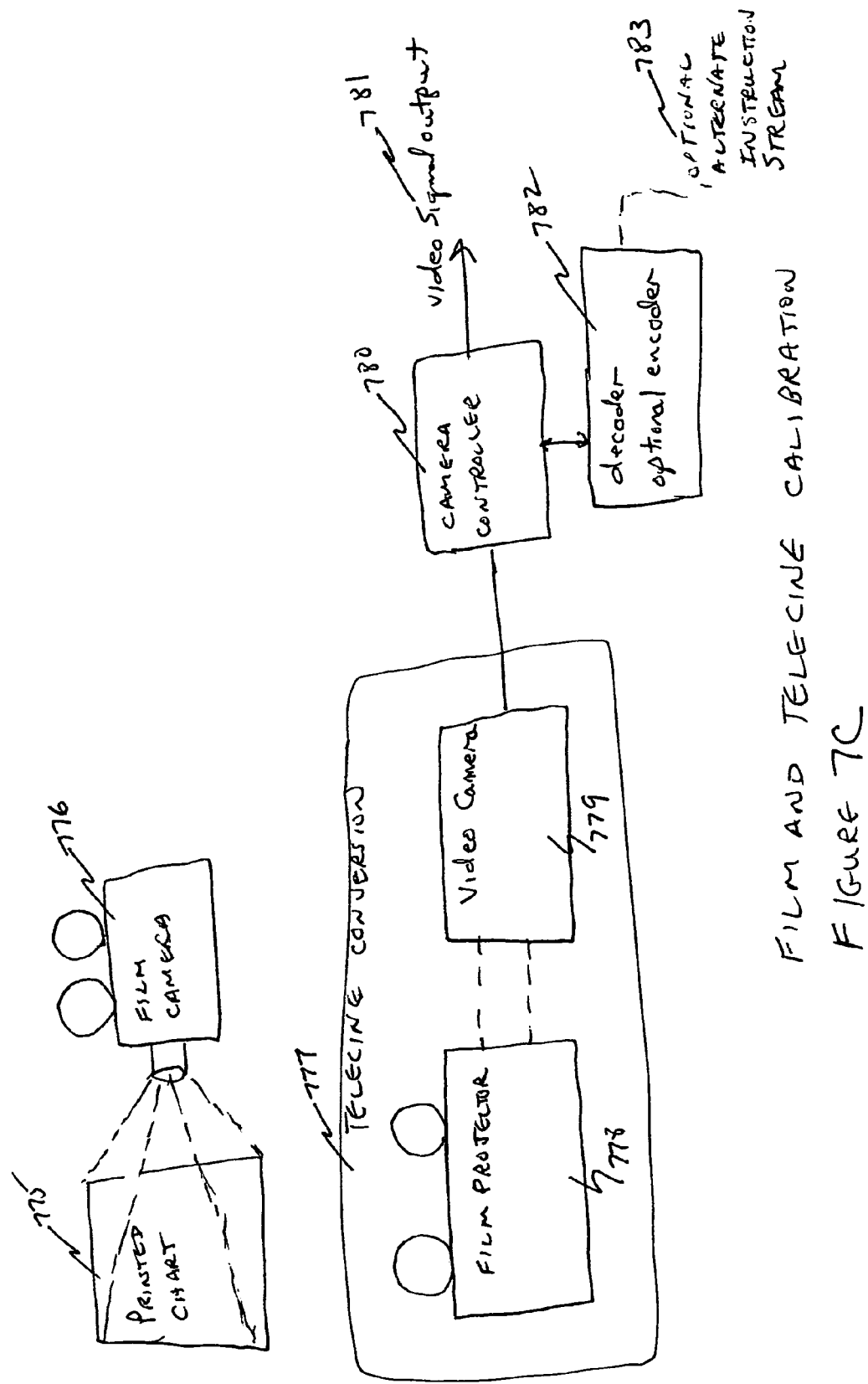

FACTORY CALIBRATION

AUTOMATIC AND INTERACTIVE CONFIGURATION AND CONTROL OF A VIDEO SYSTEM

CLAIM TO PRIORITY

This application claims priority from U.S. provisional patent application Ser. No. 60/663,557 filed Mar. 18, 2005, and Ser. No. 60/672,327 filed Apr. 18, 2005, both of which are incorporated by reference herein.

BACKGROUND OF THE DISCLOSURE

Field of the Invention

This invention relates to a method for automatically configuring, setting up, adjusting, calibrating, and controlling a television display, a display connected to a computer or game console, a production studio video camera, or a production film Telecine camera, in order to obtain optimum image accuracy and picture quality. The same architecture can also be used with audio systems.

Accurately configuring, setting up, adjusting, calibrating, and controlling a television, computer display, or any other display based video system is a fairly complex process. Specifically, there are many components and stages in the video signal processing chain between the various signal sources, such as a video camera, DVD player, computer or game console, and the terminal output device, such as a display (monitor or projector) or an image storage media device. In addition, each of the components in the video signal chain can have its own control settings and calibration adjustments that also need to be accurately set: first at the factory where each component is manufactured, and then afterwards by the operators (technicians, production personnel, end users, or consumers) of the components in the video system. It is up to the operators to try to use all available service and user controls so that all of the video signal sources deliver optimal image quality and accuracy. Generally, the adjustments are performed by eye, sometimes with the use of test patterns, and also sometimes with instruments that can measure the video signals or the displayed image. The most complex components are associated with a signal source, which is often a video camera that requires many control settings and calibration adjustments in order to capture an image accurately, and an output display which also requires many control settings and calibration adjustments in order to accurately display an image.

Further complicating this process is the fact that displays are frequently connected to many different signal sources, each particular combination of a signal source and display requires an independent set of adjustments and calibrations. Many of the signal sources may be able to deliver the video signal in a number of different analog or digital formats and via a number of different connection methods. In addition, the signals from different devices and connections will be of variable accuracy and quality and may vary from one program source to another, so the optimum settings actually vary with the video content and are not fixed.

The accurate adjustment and calibration of all of the components and their controls is generally beyond the expertise and capabilities of most operators, so most video equipment is improperly set up and performs sub-optimally, hence producing inaccurate and substandard image quality. Even when proper technical expertise and calibration equipment are available, the process is tedious and time consuming, so it is generally not always performed when necessary or desirable.

Technicians are also generally unable to accurately perform adjustments and calibrations because of the limited functionality of the available user and service controls and because they generally can not perform extensive quantitative signal measurements and advanced data processing and data reduction procedures necessary to accurately adjust and normalize all of the input signals to a common optimum performance standard.

Further, the most common current implementation for calibration by consumers or operators is to watch a special DVD that includes set up test patterns and then normally follow the on-screen or audio explanations of what they should do. Many professionally produced DVDs include some test patterns with explanations as part of the DVD's Special Features. Technicians typically use a test pattern signal generator, a waveform monitor and a photometer or calorimeter.

Hence, a need exists in the art for a process that can automate all of the above manual procedures.

SUMMARY OF THE INVENTION

The present invention advantageously meets this need.

In accordance with my inventive teachings, a sequence of computer-like commands are added to the video signal stream and contain data processing instructions and video test patterns in order to automate the integration, configuration, set up, adjustment, calibration and control of the components in a video system.

In particular, the instructions consist of computer-like operation codes with one or more optional data operands that can specify data values or memory or register addresses in the decoder's processing element. Some commands will have one or more test pattern sequences that will allow the decoders to measure one or more video signal values associated with an instruction. The measured values will be processed by the instruction or stored in decoder registers or memory. The behavior and architecture will be similar to that of a computer's central processing unit.

Some commands will control the video component hardware though computer-like device control registers operated by the decoder. For example, a display's brightness, contrast, color saturation, and gamma tables would be controlled in this fashion. Other commands will include data or perform mathematical and logical operations on operands, registers, and memory, including video image memory such as line buffers or frame buffers. A sequence of such commands will behave like a computer program and will be able to perform complex tasks and calculations and make high-level decisions. This will allow each signal source to automatically configure, set up, adjust, calibrate, and control all of the video components connected to it.

BRIEF DESCRIPTION OF THE DRAWINGS

The teachings of the present invention will be readily apparent to those skilled in the art from considering the following detailed description in conjunction with the drawings in which:

FIG. 1 shows a block diagram of a generalized video system that incorporates the type of components being considered in the invention.

FIG. 2A shows a functional diagram for a signal source that does not have command aware hardware.

FIG. 2C shows a functional diagram for a video component that is command unaware.

FIG. 2D shows a functional diagram for a command aware display that can be automatically configured, set up, adjusted, calibrated and controlled using the invention.

FIG. 3 shows a functional diagram for a command encoder and/or decoder that is incorporated into a video component.

FIG. 4 shows the architecture for the invention commands, consisting of an instruction area and a test pattern area.

FIG. 5 shows the instruction architecture for different types of configurable commands.

FIG. 6A shows a command example for initial set up and calibration, where a large number of commands and measurements are needed.

FIG. 6B shows a command example for normal operation when video program content is being shown.

FIG. 6C shows an interactive calibration screen command example where the operator views the image and makes a selection or adjustment.

FIG. 7A shows a printed command chart for use with video cameras and film cameras.

FIG. 7B shows a functional block diagram for automatic video camera calibration using the invention.

FIG. 7C shows the automated procedure for Telecine conversion and calibration of film camera content.

DETAILED DESCRIPTION

Figure 2B:
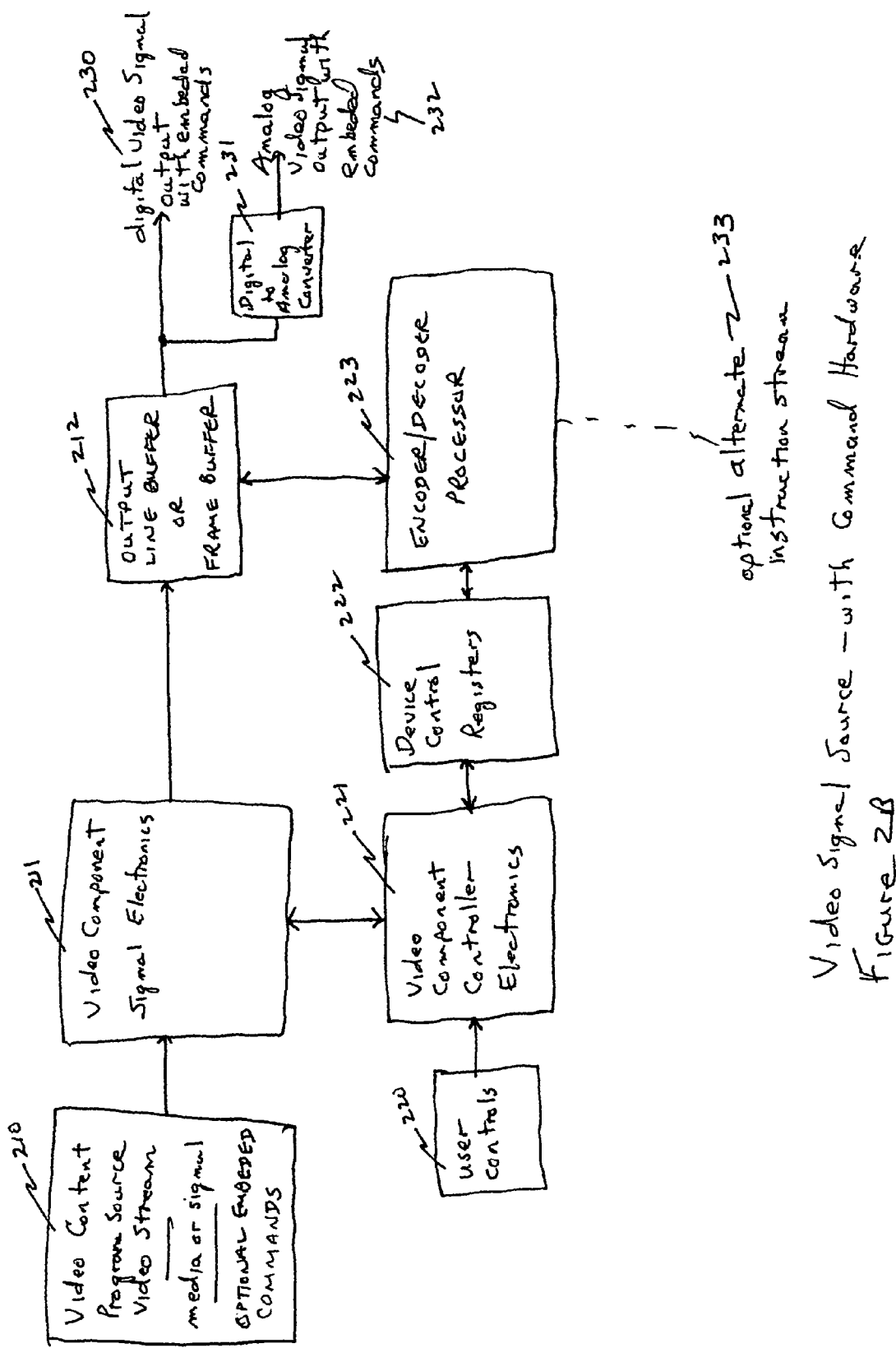
FIG. 2B shows a functional diagram for a signal source that does have command aware hardware.

Overview:

Broadly speaking, the present invention involves the use of a sequence of computer-like commands which are added to the video signal stream and contain data processing instructions and video test patterns in order to automate the integration, configuration, set up, adjustment, calibration and control of the components in a video system.

The commands are principally generated by signal sources such as cameras, DVD players, computers, game consoles, cable or satellite provider set top boxes, camcorders, and digital cameras. The commands are principally decoded and executed by terminal devices such as televisions, displays, monitors and projectors, and by camera controllers. However, any component in a video stream will be able to both generate commands and decode them. The decoder is a processing element that examines the data in the video signal, locates the command data, parses, analyzes, looks up the precise meaning of each section of the instruction, and then executes it. Components that are command unaware will unknowingly and passively transmit the commands as part of the video stream.

The instructions consist of computer-like operation codes with one or more optional data operands that can specify data values or memory or register addresses in the decoder's processing element. Some commands will have one or more test pattern sequences that will allow the decoders to measure one or more video signal values associated with an instruction. The measured values will be processed by the instruction or stored in decoder registers or memory. The behavior and architecture will be similar to that of a computer's central processing unit.

Some commands will control the video component hardware though computer-like device control registers operated by the decoder. For example, a display's brightness, contrast, color saturation, and gamma tables would be controlled in this fashion. Other commands will include data or perform mathematical and logical operations on operands, registers, and memory, including video image memory such as line buffers or frame buffers. A sequence of such commands will behave like a computer program and will be able to perform complex tasks and calculations and make high-level decisions. This will allow each signal source to automatically configure, set up, adjust, calibrate, and control all of the video components connected to it.

In an analog signal system the test pattern signals will be measured by dedicated analog signal processing electronics, and reported as digital values to the decoder. In a digital signal system (including analog signals that have been converted to digital values), the test pattern signal values will be obtained directly from designated pixels in the video signal stream. This is especially easy when there is an image line buffer or frame buffer. The measured values will become data for the decoder registers or memory.

Examples of commands include, for example: determining, specifying or measuring the video black level or reference white signal level, setting the black level control, measuring the signal data value for a test pattern element, initiating a measurement of the room ambient light level, controlling the brightness of the display light source, setting the display for narrow screen or widescreen, adjusting the color saturation and primary colors for a display, calculating or downloading the gray-scale transfer function look up table for the display, specifying or calculating the decoder matrix values, switching between different look up tables or matrix coefficients, switching between different industry standards, measuring the data value for a particular pixel and storing the result in a processor register, performing mathematical and logical operations on stored data values, using the results to set device control values, downloading the instructions for a new command, and generating an information screen that displays the current configuration and control settings.

Advantageously, very accurate video device calibrations can be performed by the inventive method because there can be a large number of test pattern measurements together with complex data processing and data reduction algorithms. The automatic and quantitative adjustment methods in this invention will produce image quality improvements that consumers or technicians will be unable to achieve with current methods. The reason for the image quality and accuracy improvement is that the video system automatically performs a large number of quantitative signal measurements and calculations that are used to obtain the optimum calibration and control settings. An additional advantage of this invention is that the signal sources can control every parameter of every component in the video system. This can eliminate the need for separate remote controls and individual on-screen menus for each component. The remote control for the signal source can control the entire video system.

The program material coming from any particular signal source generally varies from program to program, so the optimum calibration settings can also vary with the content being shown, so there is a provision to temporarily alter the calibration and control settings of the video system in order to customize and the optimize picture quality for the current content. For example, in a DVD movie with many dark scenes, commands could be included that would modify the calibration settings to improve the picture quality for these conditions. This feature is also particularly useful for video games, which will be able to re-calibrate and re-adjust the display based on the anticipated video content in the game. So the software content providers, such as broadcasters, movie studios, and game developers, can then use this technology to improve the quality of their images by incorporating commands into their program content. Any HDTVs or other devices that are command unaware will ignore the commands and not benefit from the optimizations.

The optimum calibration settings for a consumer video system depend upon the hardware calibration settings and user control settings for the signal source, the output display, and all other components in the video stream between the two. The invention addresses these issues with command sequences initiated by the video system hardware components. The optimum calibration settings for any particular program content that is being viewed on the video system will also depend on the calibration settings of the production hardware and the calibration settings for the content used during production and post-production. The invention addresses these issues with command sequences embedded within the video program content that can automatically make adjustments to the calibration settings in the consumer video system where the content is being viewed.

Components will store the settings and data for each signal source in non-volatile decoder memory so that these settings can be recalled when the signal source is active again. The main set up program for a signal source will generally be performed only once when it is first added to a video system, but it may need to be run again when there is a change in the video system configuration. Additional command sequences may run intermittently or continuously when the video system is in normal operation in order to transmit instructions and make adjustments during a program. Some command sequences may originate with the signal source hardware and others with the video program content.

The command set will consist of both simple but versatile low-level commands and high-level commands that will perform specific complex operations that are needed frequently. Some commands will be generic for all implementations, some for specific devices, and some for specific makes and models of components.

The easiest and most basic implementation will be the minimum command set needed to set the specific device control registers for a particular model of TV. A set up DVD would be produced that would generate the needed sequence of commands and it would be bundled with the TV for use by the consumer to automatically configure, set up, adjust, calibrate and control the TV.

Devices will ignore commands not intended for them or those they do not understand. The commands will be able to execute very quickly at the frame rate of the video signal, so that an entire configuration, set up, and calibration procedure can be completed quickly.

The instructions and test patterns are transmitted in the video signal stream, in either the active or inactive portions, however, the instructions can also be transmitted on separate two-way data channels as well. Both the instructions and test patterns can be sent via either analog or digital video signal paths. An advantage of including them in the active portion of the video signal is that it is guaranteed to work in all possible video system hardware configurations.

An example of a straight forward implementation of this invention would an automatic set-up DVD that would be included with the sale of an HDTV. The purchaser would put the set-up DVD into his (her) existing DVD player and it would be able to quickly perform the entire configuration, set-up and calibration automatically and unattended. When a standard set of commands is adopted by many manufacturers it will be possible to include command sequences within television programs, DVD movies, games and other source material to perform some temporary adjustments and calibrations for their video content.

For television studio production, a sequence of printed charts with instructions and test patterns would be used to automatically set up and calibrate the video cameras. Film cameras would use similar charts that would later be used to calibrate Telecine cameras when their content is converted to video.

The same command architecture can be used with both analog and digital audio systems in order to configure, set up, adjustment, calibrate, and control them. The advantages are the same as for the video system. The speaker and other signal outputs would be suppressed or muted under command control for many of the operations. Some command sequences can be made inaudible by using very low or very high frequencies.

In accordance with my specific inventive teachings, a stream of computer-like commands with operation codes, digital instructions, and data together with embedded signal based test patterns, all of which are encoded as pixel values within the active portion of the video signal are used to communicate with and control all of the components and stages in an entire video system signal path. The commands can be transmitted via either analog or digital video signal connections and channels.

The commands would be generated intermittently as needed and can use all of the active video for intensive calibration tasks or be hidden on a single line in an unseen or obscure part of the image and encoded for minimum visibility. If the command is being transmitted during normal viewing (as opposed to a dedicated calibration) it can be, for example, positioned on the last line of the active video signal so that the terminal display can simply drop it from the image so it isn't seen, or replaced with the content from an adjacent line, so it is not noticed.

Although the commands can in principle be included within the inactive portion of the video signal, such as during the vertical blanking period, in the same fashion as closed captioning and vertical interval test signals, not all video standards support such transmissions (for example, DVDs outside of Region 1 do not), and for those that do, not all video equipment will transmit such signals, so the functionality cannot be guaranteed in the same way that it can for active video based commands.

The commands can be generated by any component in the video signal path, but would primarily originate from each primary signal source, such as a DVD player, computer or game console. The instructions and test patterns are transmitted in the video signal stream, in either the active or inactive portions, however, the instructions can also be transmitted on separate two-way data channels as well.

The commands are decoded and executed by processing elements included within command aware video components. They constantly scan the video signal stream for command signatures. When one is identified, it is decoded and executed. The video component hardware operation would then be controlled by using standard device control registers. The operational behavior is similar to an image processing system where commands are sometimes embedded within the images. This functionality imparts a computer system like intelligence and organization that is distributed between the signal source, which provides a stream of program control commands, and the downstream video components, which have the processing, local memory, and measurement functions needed for determining the calibration values.

In an analog signal system, the test pattern signals will be measured by dedicated analog signal processing electronics, and reported as digital values to the decoder. In a digital signal system (including analog signals that have been converted to digital values), the test pattern signal values will be obtained directly from designated pixels in the video signal stream. This is especially easy when there is an image line buffer or frame buffer. The measured values will become data for the processor's registers or memory.

The instructions can be simple commands (with just an operation code) or complex commands (with an operation code and multiple immediate data values) that set configurations, initiate measurements of the test pattern signal values, perform complex mathematical and logical operations on data, and set control values, register values, memory values, image values, and look up table values. A carefully planned sequence of instructions will be necessary in order to perform most of the desired calibration operations as a series of small interrelated steps. All of the complex operational functionality that is needed is built up in this fashion.

The entire process functions similar to a distributed stored program computer system, with the appropriate instructions and commands originating with each signal source, and customized for the particular functionality of the signal source. Just as in the case of a traditional computer program, there would be many different possible sequences of instructions to perform a given operation. The command streams would, for example, be included with a special set-up DVD that would come bundled with a television, a DVD player, or a game console. For a camcorder, the command stream would be stored on a special set-up tape, and with a digital camera via commands stored in flash memory.

The commands can be transmitted at the full frame-rate of the video signal and many commands can be sent per video field or frame. As a result, the processing speed and data transmission rates can be very high, so the operations execute quickly.

All of the components can be completely initialized, programmed, controlled, calibrated, and operated through this video signal path processing method, so alternative communication methods, control schemes, data channels, and circuitry are not necessary, reducing complexity and cost of developing and manufacturing the hardware.

Using commands that are based in the active video portion of the video signal guarantees that they will work for every type of video source, video standard and video system. It works transparently for all signal sources and connection methods. Components in the video signal path that are not command aware, such as dumb or legacy devices, will simply unknowingly and passively pass through the command information in the video signal. Components that are command aware can block the transmission of some commands to downstream components until they complete their own calibration. With the proper command sequence, the invention automatically produces a very orderly and layered calibration procedure along the entire video signal chain. Individual components can be selectively addressed and controlled with appropriate commands. Components can also initiate commands so as to communicate and control other specific components and stages downstream from them. For example, a DVD player or Set Top Box can send configuration commands to a particular component switcher or an image scaler. The switcher and scaler can in turn initiate commands that control the downstream terminal display.

This functionality can be implemented with a simple processor element contained within the component or stage electronics that examines and decodes the video signal stream by looking for the embedded commands and data. Such processors are already included within many video components. They would need to be programmed for the functionality that is described here.

Each active stage in the signal chain will process the sequence of video images, search for and decode the embedded commands with its processor, sample and measure the test pattern signals, perform the necessary operations and calculations on the data, and then set the appropriate device control register values for the component.

The commands would be constructed as a binary coded sequence of pixel values on a designated line in the active video portion of the image. For example, a set black level command would include its unique operation code, which is specified as a binary numerical value through a sequence of pixels coded above and below a set threshold value, followed by a test pattern signal set to the current analog or digital black level for that signal source. The component would decode the instruction by determining the binary value of the operation code, then measure the signal level in the designated test pattern area of the image, and set its black level device control register to that value. A specify black level command would be similar, but have a different operation code and include a binary data value after the operation code that would be used for setting the black level register. A measure black level command would also be similar, but have a different operation code, and would instead store the measured test pattern black level value in data register, which could be used for later calculations and settings.

General purpose commands would include computer-like arithmetic, logical, memory, and data register operations. Video hardware device control would be implemented through standard device register operations. Using low-level computer-like processing instructions allows extensible and complex functionality to be implemented as a sequence of commands that operate on the image data in the video stream. Complex high-level commands like the above black level command can be built-in and programmed into the processing element or they can assembled as a sequence of simpler lower level commands. The set of commands would be very flexible and be defined for whatever functions are required by the video hardware. Some commands can be generic for a class of devices, others can be customized for a particular make and model. Devices can ignore commands that are not intended for them or that they do not understand. The command structure can also be self-extensible because new commands and subroutines can be downloaded into an command processor's non-volatile memory. Each component can store the control and calibration values that have been obtained for each signal source within its non-volatile memory. When a signal source becomes active, it can get the entire video system signal chain to recall its calibration and control setting by issuing a single device identification command.

Implementation Details:

FIG. 1 shows a block diagram for a generalized video system that incorporates elements that are found in a production studio and in a consumer's home video system. Some of the components are command aware, however, many of the components do not need to be command aware as discussed below.

There are two video components 100 and 101 that are video signal sources, such as a DVD player, VCR, DVR, camcorder, or broadcast tuner. There are two video cameras 104 and 107 that are controlled and calibrated through camera controllers 105 and 108. For calibration, the cameras use command charts 103 and 106. Each of these signal sources is fed to an optional video switcher 120, an optional video processor 121, an optional video component 122 that can be any type of commonly available video equipment, and optional distribution amplifier 123. In the configuration shown, only a single video signal is active at any one time. The active video signal is being shown simultaneously on displays 131 and 132, being recorded in video recorder 133, and being encoded for transmission in 134. All of these components do not need to be command aware. Components that are not command aware will simply passively transmit the commands as part of the video signal stream. The command aware cameras are calibrated via a sequence of command charts 103 and 106 processed by the camera controllers 105 and 108. The command aware displays 131 and 132, video recorder 133, and video encoder 134 are calibrated by video commands sent by signal sources 100, 101, 105 and 108. If video components 120, 121, 122 and 123 are command aware they can be controlled and calibrated automatically, and they themselves can actively transmit commands to other components in the video stream, otherwise they passively transmit the commands. The command instructions are carried by the video signal, but the instructions can also be carried by an optional alternate instruction stream 140.

FIG. 2A shows a video signal source 202 that does not have any command aware hardware. It is command unaware. However, the video program content 201 delivered by the hardware can have commands embedded within the video signal stream that were added by a producer of content, such as the content in a prerecorded DVD, a VCR tape, a camcorder tape, or a television broadcast signal. The analog or digital video output signal 203 of the video component 202 will have embedded commands if the content producer included them in the content 201, even though the component hardware is command unaware. The fact that the video system maintains full command and control functionality even when all intervening video components in the video signal chain are command unaware is a very important advantage of the invention.

FIG. 2B shows a video component signal source 211 that is command aware. It can decode and process commands included within the video program content 210. The commands can be used to control and calibrate the video component signal hardware 211 via controller 221 using the device control registers 222 that are under decoder processor 223 control. The commands also appear in the video signal outputs: digital 230 and analog 232 obtained from Digital to Analog converter 231. The processor 223 can also encode commands that are subsequently added to the output video signal streams 230 and 232. The commands can originate from instructions stored in processor 223, or result from operator actions via the user controls 220 that modify the device control registers 222 that communicate with the processor 223, or be a response to commands decoded by the processor 223 that originated with the video content 210. The processor can also receive commands via an optional alternate command stream 233.

FIG. 2C shows a video component 240 that is command unaware. Components that are not command aware will passively transmit all commands in their video signal input 241 to their video signal output 242. As a result dumb or legacy devices can be used throughout and do not affect the command operation of the video system. The fact that the video system maintains full command and control functionality even when all intervening video components in the video signal chain are command unaware is a very important advantage of the invention.

FIG. 2D shows a command aware display, which is one of the most complex and difficult video system devices to configure, calibrate, adjust and control. The processor 260 decodes commands that arrive embedded in the video signal 250 by examining the input line buffer or frame buffer 251. After executing the commands, the processor 260 will set the device control registers 261 which control the display signal electronics 252 via the controller 254. The complex calibration measurements and data processing will result in a very accurate image produced on the display device 253. The processor can also receive commands via an optional alternate command stream 262.

FIG. 3 shows the functional block diagram for an encoder or decoder. For a decoder, the processor 301 reads the video component's line buffer or frame buffer 300. For an encoder, the processor 301 writes to the buffer 300. A processor 301 can act as both an encoder and decoder, although this is not required. The processor 301 operates under the control of native machine instruction programs stored in its Random Access Memory 305 in the same manner as most computers. The set of such programs provides the processor 301 with appropriate operating functionality. If the processor is equipped with a decoder, then it can store new programs that are downloaded via the video signal stream as command data.

For decoding, processor 301 identifies the portion of the video signal that contains the command instructions and stores it in buffer 302, and the portion that contains the test pattern and stores it in buffer 303. Buffers 302 and 303 may be a designated area of the processor's main memory 305. For decoding, the processor examines the video instruction buffer 302 with its decoding programs and extracts the information in the instruction and then executes the appropriate operations as specified in its stored program for that instruction. If the command code references a test pattern, the processor examines test pattern buffer 303 and performs the appropriate operations on the data in buffer 303 based on the command and its programming. When executing the command, the processor 301 may reference its memory 305 for previously stored information, and the device control registers 306 which indicate the current settings of the video component hardware.

For encoding, the processor 301 loads the video instruction buffer 302 and test pattern buffer 303 with appropriate data values under computer program control and then writes the buffers 301 and 302 to the appropriate area of the buffer 300.

Non-volatile memory 304 is used to permanently store configuration and calibration data for each signal source and for the video component that the processor 301 is associated with. The non-volatile memory also stores the programming for the processor. When the system is powered up, the appropriate portions of non-volatile memory 304 are copied into RAM memory 305 as part of a boot sequence.

The processor can also receive commands via an optional alternate instruction stream 310. In FIG. 3 the video signal buffer 300 is digital, but analog signals can also be used with appropriate signal processing and analog to digital converters.

FIG. 4 describes the command architecture, which consists of an instruction that is placed in a designated area 401 in the active video signal area 400, and a test pattern that is placed in designated area 402. A more compact version can be defined where the instruction area 451 and test pattern area 452 share the same line locations in the active video signal area 450. The locations are specified by offsets 403 though 409, and 453 through 456. The locations can be predefined, or specified by previous commands. The decoder can also automatically locate a command by searching the active video area for video data that matches a specified command code data sequence. More than one instruction and test pattern can be included in the active video signal area 400 or 450. The commands can also be included in the inactive portion of the video signal, but that may not work for certain video standards and components.

The instruction 401 or 451 consists of binary coded data that will be described in detail below. If the video signal is analog then an analog-to-digital conversion will be needed in order to decode the instruction. Virtually all displays that accept analog signals already perform such a conversion. The content of the test pattern area is predefined for each instruction, or can be specified by previous instructions.

FIG. 5 shows the command instruction architecture. An instruction consists of binary data values that can be configured in many different ways. The configurable command area 500 is the total number of bits available on a given line in the video signal for instructions. It can be any value up to the number of horizontal pixels in the image, which is one instruction bit per pixel. If the video signal can be analog, or there can be image processing, image scaling, or noise in the video signal, then multiple pixels per instruction bit are needed. For example, 4 pixels per instruction bit would mean that the total number of instruction bits in the command area would be one quarter of the number of pixels. For the HDTV resolution of 1280×720, there would then be 320 instruction bits per line.

The previous discussion assumes that each instruction bit will only take on two values: a logical zero, corresponding to black, and a logical one corresponding to the peak intensity. In fact, each image pixel can take on a specified number of intensity levels, typically 256, corresponding to 8 intensity bits, but it can be more or it can be less. There are also typically 3 primary colors, so frequently there are 24 bits per pixel available. As a result, it is possible to use intensity coding to increase the number of instruction bits. Regardless of the coding method, there will be a specified number of bits for the configurable command instruction area 500.

The command instruction area 500 will have one or more command codes. There will always be at least one command code 501 in the command instruction area. The length of the command code will be a specified number of bits. If the length is 16-bits, then there will be 65,536 possible command codes. A large number of command codes is necessary: some will be for generic mathematical, logical, memory and register operations. Others will be for application specific operations. Still others will be reserved for specific manufacturers, devices, test pattern measurements, etc. In fact, the instruction decoder will be operating as an emulator so the instruction architecture can be defined, redefined, or updated as desired because the decoding operations are actually performed as stored program operations by the decoder's processing unit.

Some instructions will only have a command code by itself as in 501. If there is room in the instruction area 500 then multiple command codes can be included as in 503 and 504. Otherwise, the remaining portion of the command instruction 502 or 505 would remain unused and the remaining bits set to logical zero.

Other instructions will include additional operands for data, register and memory addressing. For example, there will be many command codes 506 that require a data field 507 to follow the command code. The bit length of the data field would depend on the specific instruction. Other command codes will require two or more data fields 509 to 511. The meaning of the data and how it will be used will depend on the command code and in the programming of the instruction execution in the decoder.

Some commands will refer to device control registers as in 512 to 517. Other commands will refer to memory addresses 518 to 523. The addresses would be used to store and recall data values for command specific operations. The meaning of the registers and addresses and how they will be used will depend on the command code and the programming of the decoder. Other commands will have mixed configurations of data, register and memory operands. For example, the command code 524 could load data value 525 into the specified memory location 526 and the command code 527 could load data value 528 into the device control register specified in 529.

Some command codes will perform operations on the test pattern data area, such as storing the intensity values at specific pixel locations. Numerical calculations on the test pattern data values will be used to calibrate the device by setting each device control register to a value determined from the test pattern data and system configuration information. As many test pattern measurements will be performed as is necessary in order to accurately set every device control register value. The end result will be the most accurate calibration possible for the specified device.

Some command codes will be used to determine and adjust image geometry parameters such as size, position, centering, overscan, and the correct aspect ratio setting for the current video signal. They will work by examining pixel values in the image buffer that are generated by the signal source. For example, checking the size, position and shape of a square. Other command codes can be used to measure the native resolution of the video signal by examining the appearance of specific pixel patterns in the image buffer.

Some of these operations will be preprogrammed high-level commands. Others will be performed as a series of low level commands that operate like a computer program. With an appropriate set of commands, it will be possible to perform all of the necessary complex logical and mathematical operations on the stored data and device control register values.

Because the decoder processor is running as an emulator, the command set can be redefined or extended as needed for any given application, device, make, model, or manufacturer. In fact, one or more command codes will allow additional commands to be defined or downloaded from the video signal stream, so it will be very easy to program and update the encoders and decoders as needed. Such software upgrades could be performed with an update DVD.

FIG. 6A shows a command configuration for the initial set-up and calibration, where a large number of commands and measurements need to be performed. A large number of commands 601 through 604 can be stacked in the active video signal area 600. Four commands are shown for simplicity, but the number can be much larger. The sequence of commands can be at a rate up to the video frame rate. The decoder for a display can blank the screen or set it to a specified fixed image during the procedure so as not to distract or annoy any operators who might be watching.

FIG. 6B shows a command configuration during normal operation when video program content is being shown. During this time, commands will only be transmitted intermittently. They can be loaded quickly when the video program content goes to black and then have the decoder blank the screen as described above, so the commands are not visible. For this case, the full screen configuration in FIG. 6A can be used. Otherwise, the commands can be placed at the very top 611 or the very bottom 612 of the screen 610 where they will not be seen due to the normal one percent or more overscan in virtually all displays. The decoder can also blank these command lines or replace them with content from adjacent image lines so they are unlikely to be noticed.

Command Examples:

The following are some additional specific examples of possible commands.

Note that the set of commands is extensible and downloadable through the video signal stream to the encoder/decoder processor, which operates as a command emulator. Some commands would be defined for specific devices and others for a specific make and model of video hardware. A core set of low level commands would be defined in manners readily apparent to those skilled in this art, that perform the fundamental logical, mathematical, memory, and device control register operations. A sequence of low level commands would be able to perform any desired operation in the same manner as a typical computer program. High level commands would be defined for complex operations that are needed frequently. This would shorten and simplify the sequence of commands needed for a particular operation and also speed up their execution as well.

One or more commands would specify the device type, manufacturer identification, model number, and serial number of a signal source device. This information would be stored together with all of the configuration and calibration data for the device in the component's non-volatile memory. When a signal source becomes active it would identify itself so that all of the components in the video signal stream could load the previously stored calibration and configuration data for it. Security command functions that require manual user authorization could be implemented in order to protect the stored programming and data against commands that could harm its integrity. Program sequences that are equivalent to viruses and malware could be implemented and spread by command aware devices and content. Some commands, data, and calibration settings could be designated as temporary for the current session or current program.

Commands that control the setting of specific device options or user control values would typically be implemented as a single command code 527 with immediate data 528 and device control register 529 as in FIG. 5. The specified device control register would then be set to the specified data value. A different command code 530 would be used to load the value stored in memory location 531 into the specified device control register 532. Examples include setting the black level, peak brightness, aspect ratio, color temperature and color matrix values.

Commands that interact with the image buffer would include read pixel value and set pixel value. Five data values would be required: the x pixel address, the y pixel address, and the data for red, green and blue. This could be implemented as two commands as in 520 to 523 in FIG. 5, one for the read operation and one for the set operation.

An example of a complex high level command is the measurement of a n-step gray scale test pattern. Two data values would be needed: the number of steps n in the gray-scale and the starting memory address to store the data values obtained from the test pattern buffer. It could be implemented as command 520 to 522 in FIG. 5.

The following list illustrates some applications of the present invention:

Interactive Control:

A command is transmitted as the result of an operator-initiated action such as, for example, pressing a button on the remote control of the signal source. This allows the operator to control the entire video system from the signal source, such as a DVD player.

Interactive Calibration:

In some instances, it may be desirable to have the operator view a test pattern or test image, by eye or with instrumentation, and then make an interactive selection or adjustment based on the results. Referring to FIG. 6C, for this case the test pattern or test image 622 portion of the command would be made large and positioned in a desirable location on the screen 620, such as near the center. Text or other interactive instructions 621 and 623 could also be included on screen. A unique command code would identify the screen 624. The operator would then make a selection or adjustment by pressing a control, such as a button on a remote control, for the component that is generating the image, such as a DVD player, for example. The button press would cause a new command to be generated by the signal source, which would be decoded by all of the appropriate downstream components, which would then execute the desired adjustment. The selection or adjustment may cause a change in the generated test pattern or image, or a control or calibration change in the display or in the downstream electronics. The precise actions would depend on the particular instruction and particular control pressed.

Video Camera Calibration:

In a television studio, multiple video cameras are connected through a very complex network of amplifiers, switchers and processors that must all be accurately calibrated and matched to one another and to the production standard for the television station. The present invention can automatically calibrate the cameras. Referring to FIG. 7A, for a video camera, the instruction commands and test patterns would be generated optically rather than electronically by pointing the camera and imaging a test chart or slide. More than one instruction and test pattern can be included on a chart. Two sets of instructions and test patterns 701 to 704 are shown in the FIG. 7A but the number can be much larger. The commands would appear as large stripped bar codes 702 and 704 in designated positions on the chart and the test patterns or test images 701 and 703 would appear in similarly designated positions, possibly specified by previous commands. 710 is an enlargement of 702 and 704 and shows that the instruction would appear as a large stripped binary bar code.

Referring to FIG. 7B, the video camera 751 images the printed chart 750. The decoding unit 753 attached to the camera controller 752 processes and executes the instructions and test pattern images and makes the appropriate device adjustments in the camera controller 752 for the video camera 751. If downstream components also need this image, then the optional encoder for the processing unit 753 can insert a copy of the command in an electronically generated and encoded format, which will be easier for the other devices to decode than the chart based bar command.

A chart can include multiple instructions and test patterns. More than one chart can be used for detailed calibrations. The processor can also receive commands via an optional alternate command stream 755.

Film and Telecine Calibration:

Most professional program content is still produced on film, but frequently needs to be converted into video images that accurately match the original film. Each film production requires its own detailed calibration because of variations in film type, quality, exposure, development, and production methods. This invention can automatically calibrate the Telecine conversion. With reference to FIG. 7C, for film that will eventually be transferred to video, the film camera 776 will photograph test charts 775 in the same fashion as described for the video camera calibration discussed above and in FIG. 7A and FIG. 7B. For some command sequences, a film leader strip with boilerplate commands can be added. During the Telecine conversion 777 to video, the video camera 779 and controller 780 will image the projector 778 filmed command sequences and be calibrated in the same manner as described in Video Camera Calibration above.

Figure 8:
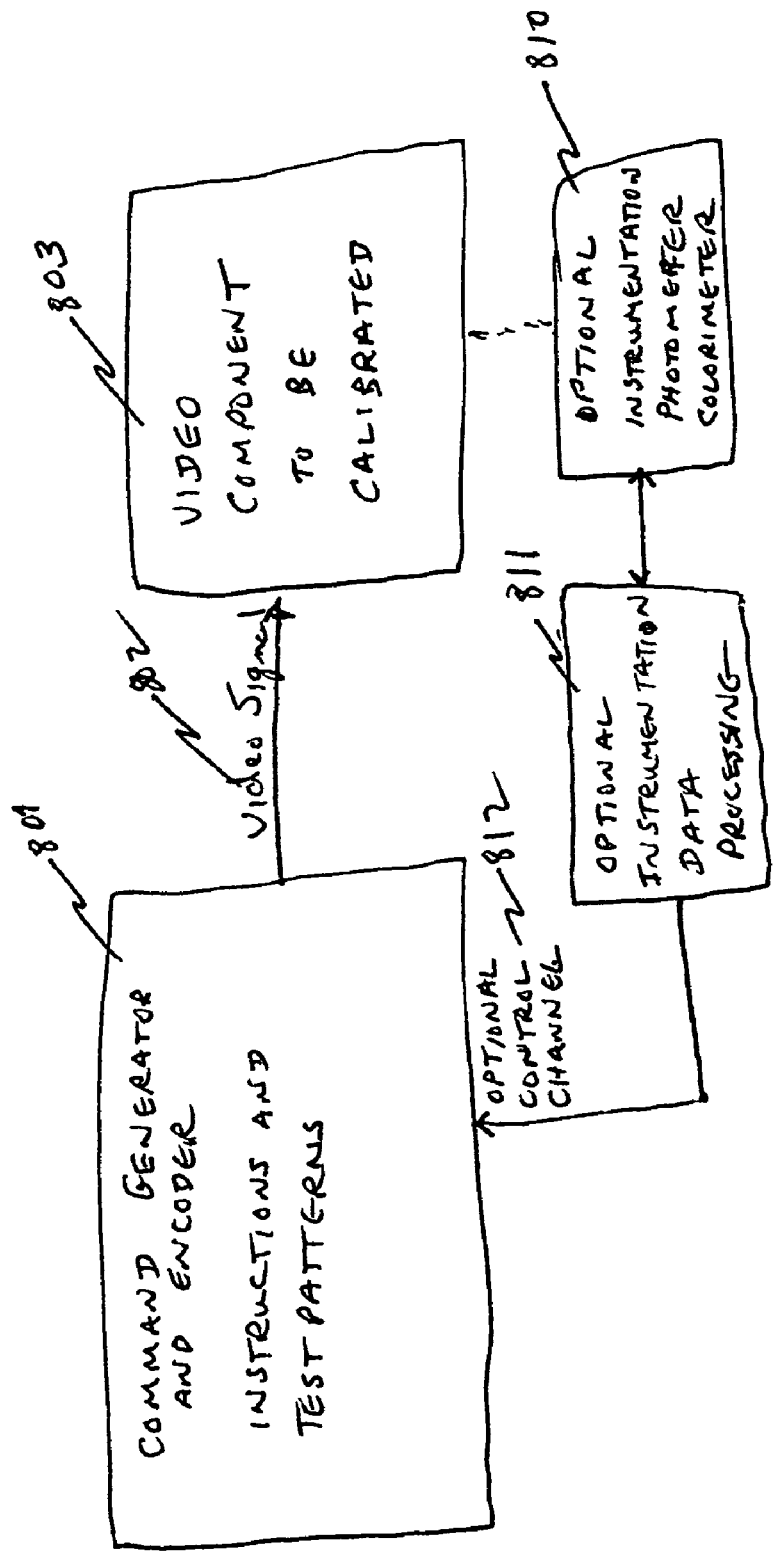
FIG. 8 shows a functional block diagram for the automated factory calibration of video components using the invention.

Factory Calibration:

In a factory that manufactures video equipment, it is generally necessary to adjust and calibrate all of the internal controls of the manufactured equipment. This generally requires special dedicated internal circuitry within each manufactured unit for the advanced data, control, and signal channels that are used only by the factory. Using the commands and architecture in the present invention will improve the accuracy of the final adjustments and calibration and reduce the complexity and cost of the factory production equipment and the hardware cost of the units being manufactured. Referring to FIG. 8, in a factory, an electronic command signal generator 801 generates the instructions and very accurate test patterns that would be used to perform the entire factory level configuration, adjustment and calibration of the manufactured video component 803 through a command sequence of instructions with test patterns. All of the commands, test patterns and data are transmitted via the video signal 802. Optional automatic measurements taken by optional instrumentation 810, such as photometers and colorimeters, and an optional instrumentation processor 811 could be used to control the command generator 801 via an optional control channel 812. The command generator 801 would modify the commands in the video signal 802 in the same manner as the Interactive calibration method described above in order to make adjustments in the component 803.

Signal Sources:

A home consumer typically has a DVD player, VCR tape player, an over-the-air broadcast tuner, computer, game console, and a Digital Video Recorder all connected to a television. There may be a component switcher, distribution amplifier, and a video processor in the signal path. There are also many specialized image processing applications that have a similar configuration, but are for medical, scientific, archival, and surveillance imaging applications. Examples of the signal sources that can be used with this invention include: DVD player, game console, computer, cable or satellite television Set Top Box, camcorder, digital camera, and Video Cassette recorder (VCR), Digital Video recorder (DVR), or other recorder. Each signal source will have a command stream that identifies itself and then produces a sequence of instructions, data, and test patterns for the downstream components, including the terminal display.

DVD Player Application:

Any existing Standard Definition DVD player already has the functionality needed to implement the automatic and interactive invention command architecture. The DVD player's built-in control language, registers, and branching capability can be used to select and then transmit an appropriate sequence of video clips recorded on the DVD that include special command sequences. A special DVD that includes a sequence of custom commands could be produced for a particular make and model of TV, for example, and then bundled with it in order to fully automate the configuration, adjustment and calibration for the consumer. Alternately, a generic DVD with a universal standard sequence of commands could be used and bundled with the DVD player. The consumer or operator would simply insert the DVD disc into the player, hit the "Play" button, and the entire process would then proceed automatically. Professionally produced DVDs, such as movies, could include command sequences within their program material to adjust the set up or calibration of the TV in order to optimize the presentation and display of their content.

The branching capability of the DVD player can be used to transmit specific video clips with unique command sequences whenever the user presses a particular button on the DVD player's remote control. This functionality optionally allows the user to make interactive adjustments based on the assessment (visual, instrumentation, or otherwise) of test patterns or test images included in the program sequence. This would be implemented, for example, by using the four Arrow keys and the Enter and Exit buttons on the DVD Remote Control to transmit interactive adjustment commands to the TV. This is accomplished by producing, e.g., seven versions of each applicable video clip, test pattern or fixed image, which will all be identical except for the embedded commands (one for no button pressed, plus e.g., six more for each of the above buttons). When the user presses a button the DVD player will use its branching capability to play the version for the selected button with the appropriate sequence of embedded commands. In that way, the command decoder in the TV will know which button the user has pressed on the DVD Remote and respond accordingly. Note that seven versions of certain clips actually will not occupy much space on the DVD because most of these clips will be static test patterns or images so they will be encoded as a few MPEG frames. The 0-9 keys and any other desired buttons can be encoded in a like manner so that the TV can recognize when they are being pressed. The existing DVD command language will allow for this implementation of buttons and branching. Information in the DVD player system registers and general purpose registers can also be used to select different video clips with different sequences of embedded commands.

The set up DVD can include demonstration and tutorial video segments that contain embedded commands so as to actively control the TV while each program segment plays on screen. The interactive setting of the TV's native On Screen Menu commands can be supported with informative and entertaining program sequences with embedded commands and interactive button control as described above.

Special video segments with diagnostic command sequences can be included on the DVD for use with the manufacturer's technical support and service personnel.

Because of the tremendous installed base of DVD players, the ability to use such a legacy device with this invention is a tremendous advantage for its implementation.

Game Console and Computer Application:

The console hardware or computer can generate command sequences. The DVD player included in most game consoles and computers can also be used to generate command sequences as in the DVD example above. Game and computer software can also include command sequences within their program material to adjust the set up or calibration of the display in order to optimize the presentation of their content.

Set Top Box or DVR Application:

The hardware in these devices can generate command sequences. Program content from broadcasters and other content providers can also include command sequences within their program material to adjust the set up or calibration of an HDTV in order to optimize the display of their content.

Camcorder, VCR or Other Tape Player/Recorder Application:

A special pre-recorded calibration tape with a sequence of commands would be inserted and played. A special tape with advanced custom commands could be produced for a particular make and model of HDTV, for example, or a generic tape with a universal standard sequence of commands could be used.

Digital Camera:

Flash memory with the stored command sequences would be inserted into the camera and would operate in the same way as the camcorder example. The sequences could also be stored in the permanent memory of the camera.

I claim:

1. A video system comprising:
   a video source for generating video content including one or more embedded commands; and
   a video processing component; and
   wherein:

the video processing component is configured for receiving the video content including the embedded commands, executing the embedded commands, and processing the video content in accordance with the embedded commands; and the embedded commands comprise operation codes such that the video processing component, upon executing respective ones of the operation codes, performs mathematical and logical processing operations in accordance with the embedded commands, the operation codes being organized in a command architecture and comprise programmed sequences of an extensible set of instructions that perform calibration of and control functions in the video processing component and further comprise an identification of the video processing component, with execution of a respective one of the operation codes selectively occurring in accordance with the identification of the video processing component.

2. The video system recited in claim 1 wherein the video content including the embedded commands is in a digital format.

3. The video system recited in claim 1 wherein the video processing component is configured as a video display device comprising:

an input buffer for receiving the video content including the embedded commands;

a decoder, in electrical communication with the input buffer, for executing the embedded commands and processing the video content through a processing element and in accordance with the embedded commands;

a device control register, in electrical communication with the decoder, for storing the embedded commands; and a controller, in electrical communication with the device control register, for controlling display parameters of the video processing component in accordance with the embedded commands.

4. The video system recited in claim 3 wherein the device control register stores one or more test patterns, data operands and memory addresses of non-volatile memory elements, and the memory elements store the embedded commands and the test patterns such that the decoder and the controller access required information for processing the video content in accordance with the embedded commands.

5. The video system recited in claim 3 wherein the embedded commands are not displayed within an active display area of the video processing component.

6. The video system recited in claim 1 wherein the video processing component is configured as a video receiver/transmitter device comprising:

a controller for receiving the video content including the embedded commands;

a user control input device, in electrical communication with the controller, for providing a user control command;

a device control register, in electrical communication with the controller, for storing the embedded commands and the user control command;

an encoder/decoder for executing the embedded commands, processing the video content so as to yield processed video content, and encoding the processed video content so as to generate an encoded video content; wherein the encoded video content comprises the processed video content and a new command that is selected from a group consisting of the embedded commands, the embedded commands with the user control command, additional embedded commands generated in the video processing component, and a combination thereof; and an output buffer, in electrical communication with the encoder/decoder, for transmitting the encoded video content.

7. The video system recited in claim 6 wherein the device control register stores test patterns, data operands and memory addresses of non-volatile memory elements and the memory elements store the embedded commands and the test patterns such that the controller and the encoder/decoder access required information for processing the video content in accordance with the embedded commands.

8. The video system recited in claim 6 further comprising a digital-to-analog converter which converts the encoded video content, held in the output buffer and prior to its transmission, to an analog signal format.

9. A method for configuring and controlling a video processing component included in a video system, the method comprising the steps of:

generating, in a video content source, video content including one or more embedded commands; and in the video processing component:
  receiving the video content including the embedded commands;
  executing the embedded commands; and
  processing the video content in accordance with the embedded commands;

wherein:
  the embedded commands comprise operation codes such that the video processing component, upon executing respective ones of the operation codes, performs mathematical and logical processing operations;
  the operation codes are organized in accordance with a command architecture and comprise programmed sequences of an extensible set of instructions for performing calibration of and control functions in the video processing component; and
  the executing step comprises the steps of:
identifying the video processing component, and selectively executing a respective one of the operation codes in accordance with the identification of the video processing component.

10. The method recited in claim 9 further comprising the steps of:

receiving the video content including the embedded commands via an input buffer;

executing the embedded commands in a decoder, the decoder being in electrical communication with the input buffer;

processing the video content in accordance with the embedded commands in the decoder;

storing the embedded commands in a device control register, wherein the device control register is in electrical communication with the decoder;

controlling, in a controller, display parameters of the video display device, wherein the controller is in electrical communication with the device control register; and displaying the video content, in accordance with the embedded commands, such that the embedded commands are not displayed in an active display area of the video display device.

11. The method recited in claim 10 wherein the storing step further comprises the step of storing test patterns, data operands and memory addresses of non-volatile memory elements wherein, the memory elements store the embedded commands and the test patterns such that the decoder and the controller access required information for processing the video content in accordance with the embedded commands.

12. The method recited in claim 9 further comprising the steps of:

receiving the video content including the embedded commands;

applying, via a controller, a user control command obtained through a user control device;

storing, in a device register, the user control command and the embedded commands;

executing the embedded commands in an encoder/decoder;

processing, in a processing element, the video content in accordance with the user control command and the embedded commands so as to yield processed video content;

encoding, in the encoder/decoder, the processed video content so as to yield encoded video content, wherein the encoded video content comprises the processed video content and a new command selected from a group consisting of the embedded commands, the embedded commands with the user control command, additional embedded commands generated in the video processing component, and a combination thereof; and transmitting, via an output buffer, the encoded video content.

13. The method recited in claim 12 wherein the storing step comprises the step of storing test patterns, data operands and memory addresses of non-volatile memory elements, wherein the memory elements store the embedded commands and the test patterns such that the controller and the encoder/decoder access required information for processing the video content in accordance with the embedded commands.

14. The method recited in claim 12 wherein the transmitting step comprises the steps of converting, through a digital-to-analog converter, the encoded video content to an analog video signal, and transmitting the analog video signal.

* * * * *